United States Patent [19]
Meyerle

[11] 3,947,642
[45] Mar. 30, 1976

[54] TELEPHONE ANSWERING SYSTEM AND APPARATUS

[75] Inventor: George M. Meyerle, New Milford, Conn.

[73] Assignee: B.S.R. (U.S.A.) Ltd., Blauvelt, N.Y.

[22] Filed: Aug. 26, 1974

[21] Appl. No.: 500,247

[52] U.S. Cl............................................. 179/6 R
[51] Int. Cl.²......................................... H04M 1/64
[58] Field of Search ...................... 179/6 R, 6 AC

[56] References Cited
UNITED STATES PATENTS

| | | | |
|---|---|---|---|
| 3,426,152 | 2/1969 | O'Halloran et al. | 179/6 R |
| 3,539,728 | 11/1970 | Rubenstein | 179/6 R |
| 3,728,487 | 4/1973 | Hata | 179/6 R |

*Primary Examiner*—Vincent P. Canney
*Attorney, Agent, or Firm*—Smythe & Moore

[57] ABSTRACT

A telephone answering device which uses a magnetic recording tape to play back previously recorded messages and to record the caller's message. The device is switched into the record mode by a prerecorded tone on the magnetic recording tape.

11 Claims, 5 Drawing Figures

FIG.2
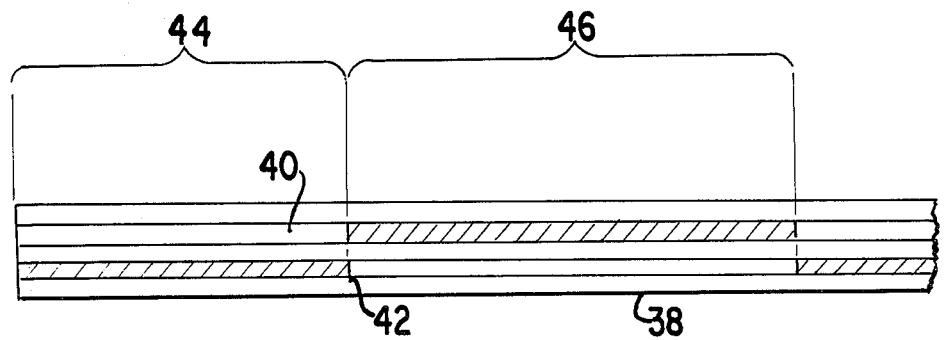
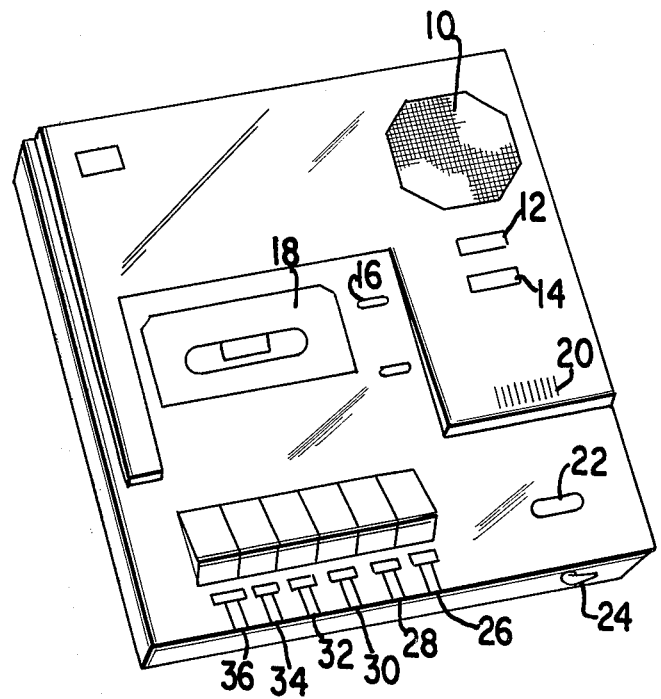
FIG.1

TELEPHONE ANSWERING SYSTEM AND APPARATUS

The present invention relates to a telephone answering device and more specifically to a telephone answering device which uses magnetic recording tape.

The prior art is replete with telephone answering devices which are quite complex and expensive. One such unit has a separate magnetic recording tape with a prerecorded message and a second tape to record the caller's message. Another unit uses a phonograph record with the prerecorded message and a magnetic recording tape to record the caller's message. A third unit uses the same magnetic recording tape for the prerecorded message and to record the caller's message and uses a mechanical system to index the tape. A fourth system uses a short multi-track recording belt in which one track has a prerecorded message and the caller's message is recorded on one of the other tracks. All of these systems have registration problems due to the indexing systems used and are overly complex due to the indexing systems and multiple tape handling mechanisms.

One of the objects of the present invention is to overcome the faults of the prior art and to provide a simple, economical and reliable telephone answering device.

Still another object of the invention is to provide a telephone answering device which uses only one magnetic recording tape for the prerecorded and caller's message.

It is yet another object of the invention to provide a telephone answering device which indexes itself by a tone recorded on the magnetic recording tape.

In general and in one aspect of the invention, there is a tape moving mechanism with a record-playback head together with a circuit for operating the same, such that in the playback state, the amplifier is energized to apply a signal to the telephone line and, in the record state, to receive and record a signal from the telephone line. There is a record sensor for sensing a record control signal on the tape and a ring sensor for initiating the operation of the tape moving mechanism. There are at least two tracks on the tape, at least one for messages and another for the record control signal.

Other objects, advantages and features of the invention will become apparent from the following description and drawings, which are merely exemplary.

In the drawings:

FIG. 1 is a perspective view of the telephone answering device;

FIG. 2 is a diagram of the recorded messages and tones on the magnetic recording tape;

Figure 3:
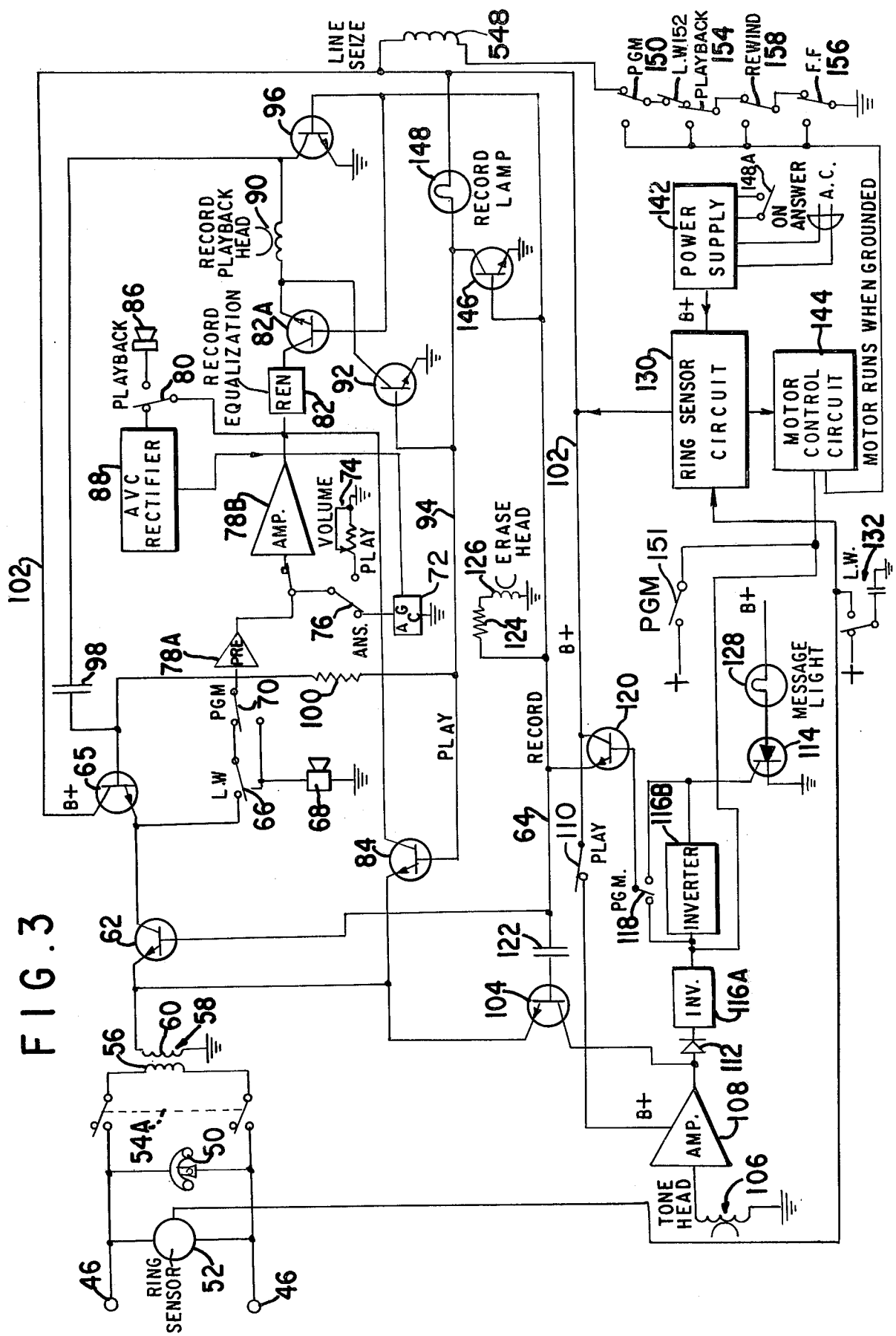
FIG. 3 is a block diagram of one embodiment of the present invention.

With reference to FIG. 1, a view of the telephone answering device is shown having speaker 10 for listening to telephone messages, message light 12 to show when the answering device has recorded a call, recording light 14 to show that the answering device is recording a message, program switch 16 to record the answering message, cassette 18 that holds the magnetic recording tape, built-in microphone 20 for recording answering messages, volume control 22 for varying the volume of the playback speaker 10, monitor button 24 for listening in as the answering device is taking a message and leave word button 26 when it is desired to leave an in-home message. Additionally, there is an off button 28, an on/answer button 30 that prepares the answering device to record or playback messages, a fast forward button 32 and a fast rewind button 34 for rapidly moving the cassette recording tape in the forward and reverse directions and a playback button 36 for listening to the recorded phone message.

With reference to FIG. 2, a section of magnetic recording tape 38 is shown having a recording track 40 and a message track 42. When a telephone ringing signal is sensed, the tape is started to move across the record-playback and record sensor head. In the first section 44 of the tape 38, no record control signal is on the track 40, so a prerecorded answering message on track 42 is played onto the telephone lines. In the second section 46 of the tape 38, a record control signal is sensed on the track 40, so a telephone caller's message is recorded on the track 38. Sections 44 and 46 are repeated many times on the recording tape so that many calls can be recorded.

With reference to FIG. 3, a telephone line is connected to telephone terminals 46 which are connected to a telephone 50, ring sensor 52 and two terminals of a double pole relay 54A. The other terminals of relay 54A are connected to a primary winding 56 of transformer 58. A secondary winding 60 of the transformer 58 is connected between an emitter terminal of transistor 62 and ground.

A base terminal of the transistor 62 is connected to a Record line 64. A collector terminal of the transistor 62 is connected to an emitter terminal of transistor 65 and one terminal of Leave Word switch 66. Another terminal of the switch 66 is connected to microphone 68 which is grounded. A third terminal of switch 66 is connected to a terminal of Program switch 70. Another terminal of switch 70 is connected to the microphone 68 and the other terminal of switch 70 is connected to preamplifier 78A. The output of 78A is connected to an automatic gain control 72 and a volume control 74 which is grounded. A Playback switch 76 can connect the output terminal of the automatic gain control 72 or the output terminal of the volume control 74 to the input of the amplifier 78B. An output terminal of the amplifier 78B is connected to a Playback switch 80, the record equalization network 82 and a collector terminal of a transistor 84. Another terminal of the switch 80 is connected to a speaker 86 and a third terminal of the switch 80 is connected to an AVC rectifier 88 which is connected to the control input of the automatic volume control 72. The output of record equalizing network 82 is connected to the collector of transistor 82A. An emitter terminal of the transistor 82A is connected to one terminal of a record-playback head 90 and a collector terminal of a transistor 92. A base terminal of the transistor 92 is connected to a play line 94. Emitter terminals of the transistors 92 and 96 are connected to ground. Base terminals of the transistors 82A and 96 are connected to the record control signal line 64. A collector terminal of the transistor 96 is connected to the other terminal of the record-playback head 90 and to capacitor 98. The capacitor 98 is connected to a base terminal of transistor 65 and to resistor 100 which is connected to the play line 94. A collector terminal of the transistor 65 is connected to B+ line 102. A base terminal of the transistor 84 is connected to the play line 94. An emitter terminal of the transistor 84 is connected to the emitter terminals of the transistors 62 and 104.

A tone head 106 is connected to an input terminal of an amplifier 108. The B+ line 102 is connected to the amplifier 108 through Play switch 110. An output terminal of the amplifier 108 is connected to collector terminal of the transistor 104 and an input terminal of a rectifier 112. An output terminal of the rectifier 112 is connected to an input terminal of an inverter 116B through inverter 116A and Program switch 118. The output terminal of the inverter 116B is connected to one terminal each of a Program switch 118 and a gate terminal of a silicon controlled rectifier. Another terminal of the switch 118 is connected to a base terminal of a transistor 120. A collector terminal of the transistor 120 is connected to the B+ line 102 and an emitter terminal of transistor 120 is connected to the Record line 64. Capacitor 122 is connected between the Record line 64 and a base terminal of the transistor 104. The Record line 64 is connected by a resistor 124 to an erase head 126, the other terminal of which is grounded. An anode terminal of the silicon controlled rectifier 114 is connected to a Message Light 128 which is connected to B+. A cathode terminal of the SCR 114 is grounded. An input terminal of the inverter 116B is connected to an input terminal of motor control circuit 144. The ring sensor circuit 130 connects B+ from a power supply 142 to a motor control circuit 144, line seize relay coil 54B and B+ line 102. The B+ line 102 is connected to a collector terminal of a transistor 146 and play line 94 by way of a record lamp 148. An emitter terminal of the transistor 146 is grounded and a base terminal is connected to the Record line 64. The power supply 142 is enabled by an On-Answer switch 148A. The line seize relay coil 54B is connected to ground by way of the Program switch 150, Leave Word switch 152, Playback switch 154, Fast Forward switch 156 and Rewind switch 158. Other terminals of the program, play rewind and fast forward switches are connected to the motor control circuit 144.

Still with reference to FIG. 3, when a telephone ring signal is sensed by the ring sensor 52 and the answering device is switched to On-Answer, the ring sensor circuit 130 energizes the B+ line 102 and the motor control circuit 144 to move the magnetic tape past the record-playback head 90, the erase head 126 and the tone head 106. The ring sensor circuit 130 has a built-in selectable time delay prior to energizing the circuits and the line seize relay coil 54B which actuates the line seize relay contacts 54A. When the transformer is connected to the telephone line, the telephone switch gear switches the caller onto the telephone line. The B+ on the B+ line 102 energizes the Play line 94 through the record lamp 148, but the current flow is insufficient to make it glow. The transistor 92 is energized to ground one side of the record-playback head 90. The transistors 82A and 96 are not energized and, therefore, do not conduct. The signal from the record-playback head is applied to the transistor 65 by way of the capacitor 98. The transistor 65 is biased on by the voltage from the Play line 94 through the resistor 100. Since the transistor 62 is not conducting, the signal from the emitter of the transistor 65 is applied through preamplifier 78A and the automatic volume control 72 to the amplifier 78B. The output signal from the amplifier 78B is applied to the transformer winding 60 by the transistor 84 which is turned on by the positive voltage on the Play line 94.

When the record control signal from tape 38, track 40 of section 46 is sensed by the tone head 106, amplified by the amplifier 108 and rectified by the rectifier 112, it is applied to the inverters 116A and 116B and to the SCR 114 which turns on the message light 128. The output terminal of the inverter 116B has a positive signal which turns on the transistor 120 to apply B+ to the Record line 64. The output signal of the inverter 116A keeps the motor control circuit 144 in its energized state and restores the device to on-hook condition when the record control signal stops. The answering message that was played by the answering device tells the caller to leave a message when a beep is heard. The beep is heard when current flow through capacitor 122 causes the transistor 104 to conduct the amplified record control signal from the tape to the transformer winding 60. This may last for approximately two seconds until the capacitor 122 is fully charged and current flow stops, turning off the transistor 104. The transistor 62 is turned on by + record line 64, conducting the caller's message signal to the automatic gain control 72 and amplifier 78A and 78B having equalization circuit 82 for recording. The Record line 64 energizes transistor 146 to ground one side of the record lamp 148 to make it glow and grounds the positive voltage on the Play line 94, therefor turning off the transistors 84 and 92. The positive voltage on the Record line 64 also turns on transistor 82A to connect the record-playback head 90 to the amplifier 78A for recording and grounds the other side of the head 90 by energizing transistor 96. Additionally, the positive voltage of the Record line 64 energizes the erase head 126 to erase the tape. Thus, the tape may be reused hundreds of times. The emitter current of transistor 82A is the record bias for head 90.

When the section 46 on the magnetic recording tape 38 for recording the caller's message runs out, there is no longer a record control signal applied to the tone head 106 from the tape, the inverters 116A, 116B no longer apply a signal to the motor control circuit 144 and the motor control circuit 144. The motor control circuit 144 has a timer which limits the off-hook time to approximately 2 minutes. This circuit hangs up the device (on-hook) if the normal mechanism fails (tape breaks or end of tape or component failure). When circuit 144 de-energizes, shutting off the answering device and removing the load on the telephone line, it indicates to the telephone switch gear that the telephone has been hung up (or placed on hook).

When the Leave Word switch is operated to record a message in the same manner as when the answering device answers the telephone, but by using the microphone 68, switch 132 energizes the ring sensor circuit to apply B+ to the B+ line 102 and to energize the motor control circuit 144. However, switch 152 is open so that the line seize relay coil 54B can not be energized. The switch 66 connects the microphone 68 to the preamplifier 78A, automatic volume control 72 and amplifier 78B for recording a message. The answering device will go into the record mode when a record control signal on the tape is sensed by the tone head 106 so a message can be recorded from the microphone.

When the Program switch is operated to record an answering message for playback when the telephone is taken off the hook by the answering device, the ring sensor circuit 130 is energized by the switch 151 to energize the motor control circuit 144 and the B+ line 102. The line seize relay coil 54B can not be energized because it is not grounded due to the opening of the switch 150. The microphone 68 is connected into the record circuit by the switch 70. Since there is no record control signal recorded on the program portion of the tape (track 40 of section 44), switch 118 connects the base terminal of the transistor 120 to the output terminal of the inverter 116A which is positive when no record control signal is sensed by the tone head 106, causing the answering device to go into the record mode.

The fast forward and rewind switches 136 and 138 move the tape rapidly in the forward or reverse direction by a mechanical system, inhibit line relay 54B and energize motor control circuit 144.

In the playback mode, the switch 154 energizes the motor control circuit 144 and also prevents operation of the line seize relay coil 54B. The motor control circuit 144 and the B+ line 102 are energized. Since it is undesirable to have the answering device go into the record mode during the playback mode, switch 110 prevents the B+ from energizing the amplifier 108, preventing the record tone from being amplified. The switch 76 connects a volume control 74 in place of the automatic gain control 72, and the switch 80 connects a loudspeaker 86 to the amplifier 78B for listening to the recording. The answering device then plays back the whole tape as in the normal playback mode.

Figure 4A:
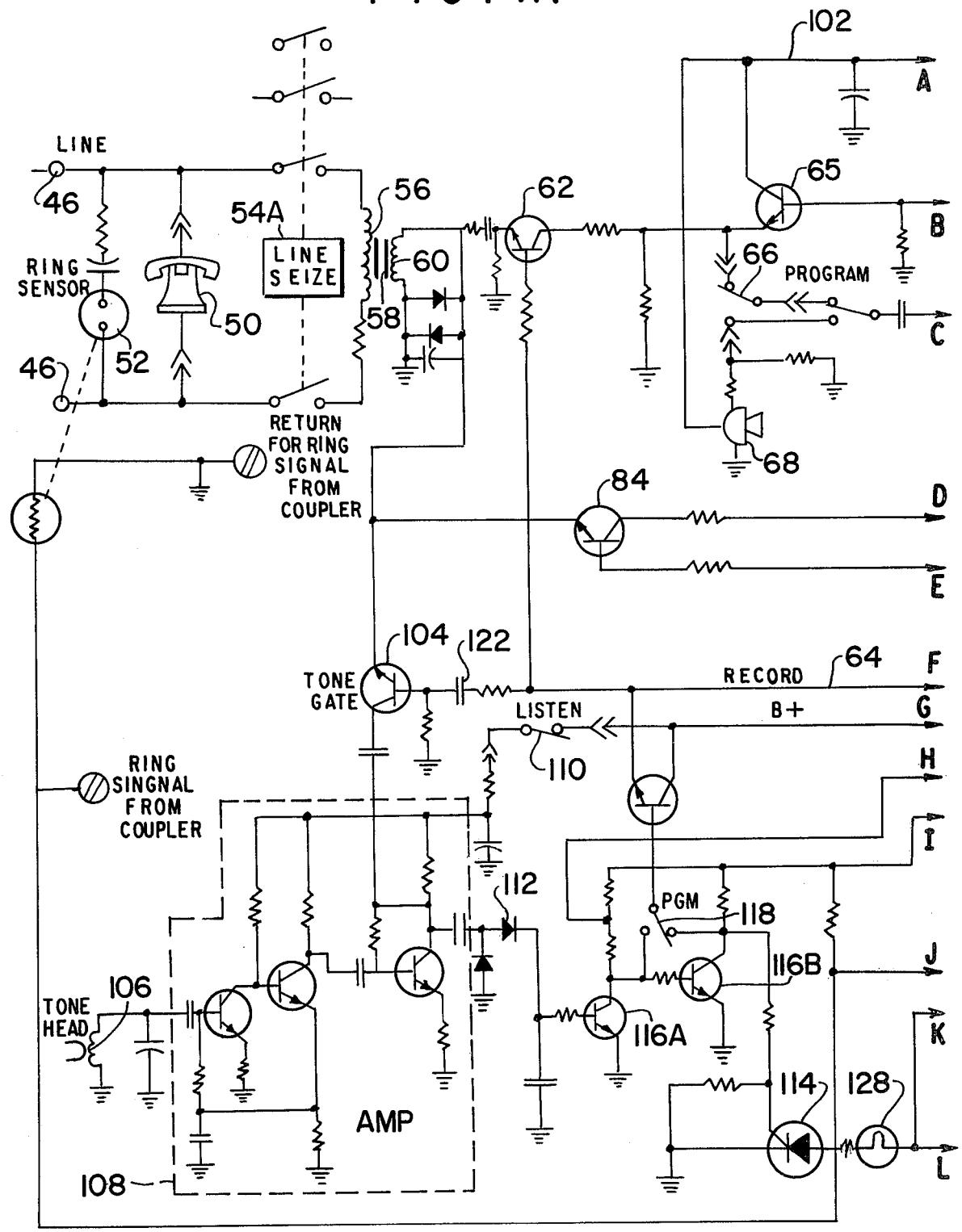
FIGS. 4A and 4B show a schematic diagram of one embodiment of the present invention.
Figure 4B:
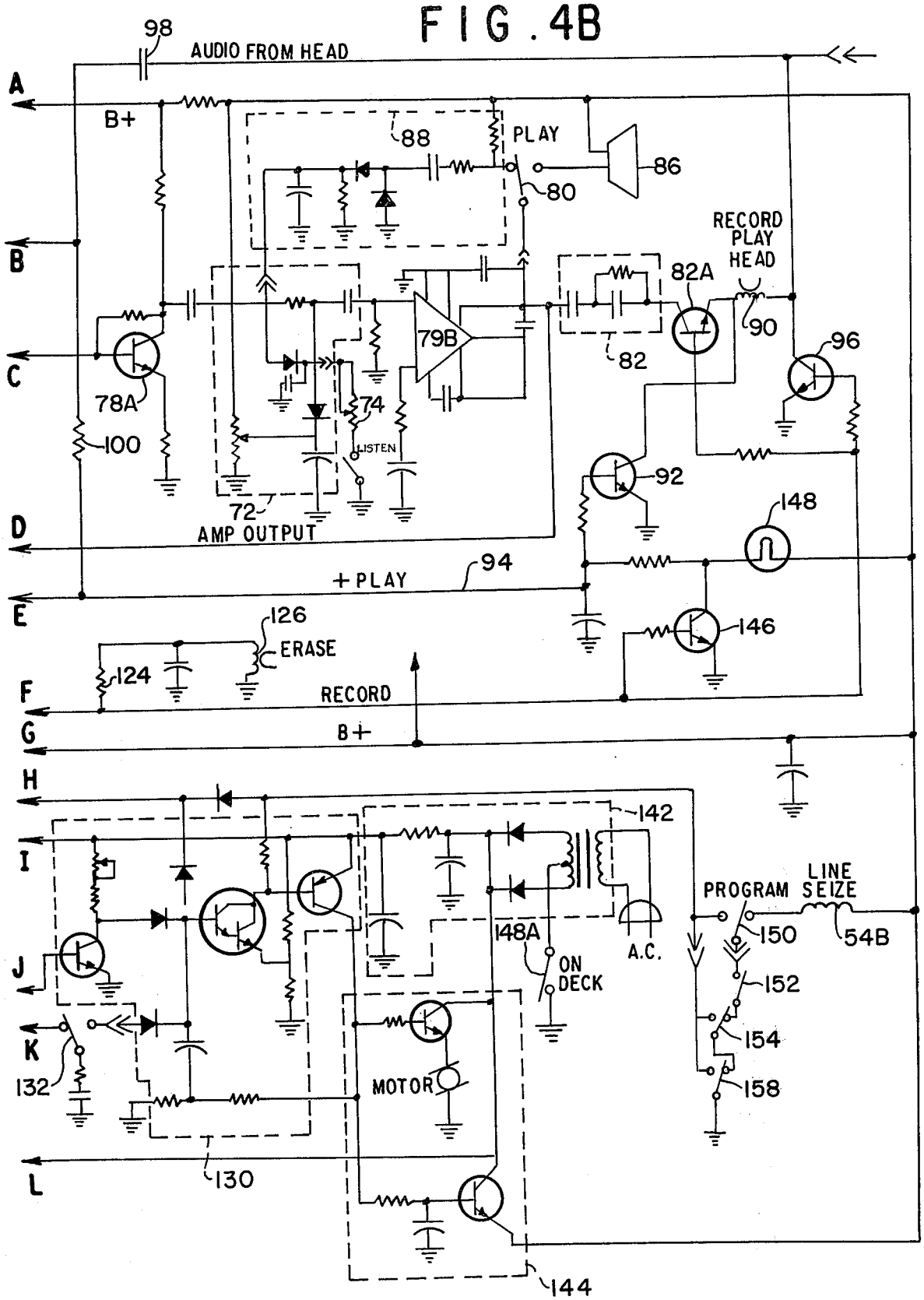

With reference to FIGS. 4A and 4B, a complete schematic diagram is shown of the telephone answering device, the operation of which is readily apparent from the previous description of FIG. 3.

It should be apparent that variations can be made in the foregoing without departing from the spirit of the invention except as defined in the appended claims.

What is claimed is:

1. A telephone answering device which connects to the telephone line and uses partially prerecorded magnetic recording tape comprising a tape transport mechanism having a magnetic record-playback head and an electric drive motor for moving the magnetic recording tape in a controlled manner across said record-playback head; a motor control circuit for operating said tape transport motor; a record-playback amplifier which in its playback state amplifies an electrical signal from said record-playback head and applies the amplified signal to the telephone lines, in its record state amplifies an electrical signal from the telephone lines and applies the amplified signal to said record-playback head; a record sensor for sensing a record control signal prerecorded on the recording tape to control the state of the record-playback amplifier; and a ring sensor for energizing said motor control and said record sensor when a ring signal is sensed, wherein when a ring signal is sensed, said motor control circuit is energized for moving the magnetic recording tape across said record-playback head and said record sensor is energized, whereby when said record sensor does not sense a record control signal, said recordplayback amplifier is in its playback state and a recorded message is applied to the telephone lines and when a record control signal is sensed, said record-playback amplifier is in its record state and a message from the telephone lines is recorded on the tape.

2. The telephone answering device as claimed in claim 1 wherein said record sensor includes tone head mounted on said tape transport and wherein the magnetic recording tape has two tracks, one track for messages and one track for a record signal.

3. The telephone answering device as claimed in claim 2 wherein said record control signal is a tone recorded on the magnetic recording tape.

4. The telephone answering device as claimed in claim 1 wherein said record sensor may be manually disenabled for playback of recorded messages.

5. The telephone answering device as claimed in claim 2 wherein said record sensor may be manually enabled without sensing a record signal wherein a message may be recorded anywhere along the length of the magnetic recording tape on the track for messages.

6. The telephone answering device as claimed in claim 1 including a microphone wherein said microphone may be used to record a message on said magnetic recording tape.

7. The telephone answering device as claimed in claim 1 wherein said tape transport mechanism has fast forward and rewind operating modes for rapid movement of the magnetic recording tape.

8. The telephone answering device as claimed in claim 1 wherein said record-playback amplifier includes an equalization network for proper equalization during the record and playback states.

9. The telephone answering device as claimed in claim 1 including an automatic gain control to prevent overloading during recording of a message.

10. The telephone answering device as claimed in claim 1 wherein said motor control circuit may be manually enabled for the playback or recording of messages and when said motor control circuit is manually enabled, the answering device is disconnected from the telephone line.

11. The telephone answering device as claimed in claim 1 wherein a beep tone signal is derived from the record control signal.

\* \* \* \* \*

UNITED STATES PATENT OFFICE
CERTIFICATE OF CORRECTION

PATENT NO. : 3,947,642
DATED : March 30, 1976
INVENTOR(S) : George M. Meyerle

It is certified that error appears in the above-identified patent and that said Letters Patent are hereby corrected as shown below:

Column 2, line 18, "38" should be --42--. Column 6, line 5, "recordplayback" should be --record-playback--; Column 6, line 16, --control-- should be inserted after "record".

Signed and Sealed this eighth Day of June 1976

[SEAL]

Attest:

RUTH C. MASON
Attesting Officer

C. MARSHALL DANN
Commissioner of Patents and Trademarks